(12) United States Patent
Marvin et al.

(10) Patent No.: US 10,476,758 B2
(45) Date of Patent: Nov. 12, 2019

(54) SYSTEMS AND METHODS FOR PROVIDING NOTIFICATIONS OF CHANGES IN A CLOUD-BASED FILE SYSTEM

(71) Applicant: Google Inc., Mountain View, CA (US)

(72) Inventors: Kyle W. Marvin, Kingwood, TX (US); Ivan Young Lee, Boulder, CO (US); Stephen Nowland Clark, Boulder, CO (US); Louis Ryan, San Francisco, CA (US); Gustavo Mendes Estephanio De Moura, Jersey City, NJ (US); Eric Benson Schoeffler, Boulder, CO (US)

(73) Assignee: Google LLC, Mountain View, CA (US)

( * ) Notice: Subject to any disclaimer, the term of this patent is extended or adjusted under 35 U.S.C. 154(b) by 135 days.

(21) Appl. No.: 13/939,819

(22) Filed: Jul. 11, 2013

(65) Prior Publication Data
US 2015/0019701 A1 Jan. 15, 2015

(51) Int. Cl.
*H04L 12/24* (2006.01)
*G06F 9/54* (2006.01)
*G06F 16/17* (2019.01)

(52) U.S. Cl.
CPC ........... *H04L 41/50* (2013.01); *G06F 9/542* (2013.01); *G06F 16/1734* (2019.01)

(58) Field of Classification Search
CPC ..... H04L 67/34; H04L 67/306; H04L 67/327; H04L 67/1097; H04L 67/22;
(Continued)

(56) References Cited

U.S. PATENT DOCUMENTS

| 8,150,959 B1* | 4/2012 | Bezdicek | G05B 23/027 709/224 |
| 2007/0199025 A1* | 8/2007 | Angiolillo | H04N 21/4113 725/47 |

(Continued)

FOREIGN PATENT DOCUMENTS

| CN | 1501255 | 6/2004 |
| CN | 103168291 | 6/2013 |

(Continued)

OTHER PUBLICATIONS

International Search Report for Application No. PCT/US2014/046394, dated Nov. 4, 2014.
(Continued)

*Primary Examiner* — Barbara B Anyan
(74) *Attorney, Agent, or Firm* — Lowenstein Sandler LLP

(57) ABSTRACT

A cloud-based file system receives a subscription request associated with a networked device and identifying a set of one or more resources of the cloud-based file system and a set of one or more resource modifications. The cloud-based file system determines whether the networked device is authorized to access the resource, and, if so, records a subscription based on the subscription request. In response to a user, an application, or other suitable entity making a modification in the set of modifications to a resource in the set of resources, the cloud-based file system generates a notification to the networked device and to other networked devices with subscriptions that include the modification to the resource. The notification may identify the subscription with which the notification is associated, provide information identifying the modification, or provide other suitable information.

15 Claims, 6 Drawing Sheets

(58) Field of Classification Search
CPC . H04L 67/1044; H04L 63/10; H04L 63/0892; H04L 63/04; H04L 41/06; H04L 41/0893
See application file for complete search history.

(56) References Cited

U.S. PATENT DOCUMENTS

| | | | |
|---|---|---|---|
| 2008/0004010 A1* | 1/2008 | Boberg | H04M 3/42365 455/435.1 |
| 2009/0164293 A1* | 6/2009 | Coley | G06Q 10/06311 705/7.13 |
| 2009/0177741 A1* | 7/2009 | Tian | H04L 63/102 709/203 |
| 2009/0228566 A1 | 9/2009 | Sharp et al. | |
| 2010/0185656 A1* | 7/2010 | Pollard | G06F 17/30578 707/769 |
| 2011/0231557 A1 | 9/2011 | Sharp et al. | |
| 2012/0005691 A1 | 1/2012 | Wong et al. | |
| 2012/0078917 A1* | 3/2012 | Gradin | G06F 17/30368 707/748 |
| 2012/0271927 A1* | 10/2012 | Shakirzyanov | G06F 9/5061 709/220 |
| 2012/0324541 A1* | 12/2012 | Palacios Valverde | H04L 12/2809 726/4 |
| 2012/0330915 A1* | 12/2012 | Mehra | G06F 17/30516 707/703 |
| 2013/0013560 A1 | 1/2013 | Goldberg et al. | |
| 2013/0103844 A1* | 4/2013 | Bulut | H04W 4/003 709/228 |
| 2013/0124613 A1* | 5/2013 | Plache | G05B 19/41835 709/203 |
| 2013/0194604 A1* | 8/2013 | Asano | G06F 3/1229 358/1.13 |
| 2013/0212160 A1* | 8/2013 | Lawson | G05B 19/4185 709/203 |
| 2013/0290457 A1* | 10/2013 | Wang | H04L 12/5815 709/206 |
| 2013/0311598 A1* | 11/2013 | Arrouye | H04L 67/1097 709/217 |
| 2013/0311986 A1* | 11/2013 | Arrouye | G06F 8/61 717/175 |
| 2013/0316640 A1* | 11/2013 | Jellison, Jr. | H04H 20/06 455/3.06 |
| 2014/0007076 A1* | 1/2014 | Kim | G06F 8/65 717/173 |
| 2014/0012616 A1* | 1/2014 | Moshenek | G06Q 10/063114 705/7.15 |
| 2014/0020072 A1* | 1/2014 | Thomas | H04L 63/0815 726/7 |
| 2014/0069091 A1* | 3/2014 | Franzoni | F15B 11/162 60/422 |
| 2014/0075034 A1* | 3/2014 | Vasudevan | H04L 47/70 709/226 |
| 2014/0087688 A1* | 3/2014 | Chiu | H04M 15/43 455/406 |
| 2014/0344215 A1* | 11/2014 | Oh | H04L 67/1095 707/608 |
| 2014/0365523 A1* | 12/2014 | Wagner | G06F 17/30864 707/770 |
| 2015/0017945 A1* | 1/2015 | Eckler | H04W 12/08 455/408 |
| 2015/0126184 A1* | 5/2015 | Holtmanns | H04W 8/20 455/432.3 |
| 2015/0131488 A1* | 5/2015 | Perez Martinez | H04L 41/5025 370/259 |
| 2015/0195286 A1* | 7/2015 | Doppler | H04L 67/125 726/4 |

FOREIGN PATENT DOCUMENTS

| | | |
|---|---|---|
| EP | 2 031 829 | 3/2009 |
| EP | 2 573 682 | 3/2013 |

OTHER PUBLICATIONS

Office Action issued by the Chinese Patent Office for CN App No. 201480039281.X, dated Jun. 18, 2018.

Summons to Oral Proceedings issued by the European Patent Office for EP App No. 14748249.9, dated Sep. 10, 2018.

* cited by examiner

SYSTEMS AND METHODS FOR PROVIDING NOTIFICATIONS OF CHANGES IN A CLOUD-BASED FILE SYSTEM

Personal computers traditionally store files locally, on a medium directly accessed by the computer generating or editing the files. As network access has become more widespread, it has become feasible to store files on a remote network. Storing files on a remote network, also referred to as cloud storage, allows a user to access the files using any device that can access the network. Such cloud storage systems reduce the user's need for local storage capacity and assure the user that, regardless of which device is accessing a file, an up-to-date copy of the file is being accessed.

Network applications that refer to resources stored on cloud storage systems typically poll the state of those resources to detect changes to the resources and act upon them. For each such resource polled by a network application, the hosting cloud storage system must respond to a request however often the network application attempts to poll the resource. As such resources may only change infrequently, such systems may generate unnecessary demands on the resources of the cloud computing system, while the network application may not act on a change to the resource until a polling period has completed and a new request for updates is made.

SUMMARY

Thus there exists a need in the art for cloud storage systems to asynchronously transmit notifications regarding changes to a resource to a network application—to "push" notifications to network applications in response to resource changes. The systems and methods described herein allow a cloud storage system to determine if a networked device is authorized to access a resource on the cloud storage system, and, if so, to subscribe the networked device to push notifications generated in response to changes made to the resource.

In certain aspects, the systems and methods described herein relate to notifying a networked device of a modification to a resource of a cloud-based file system. The cloud-based file system receives a subscription request associated with the resource and identifying the subscribing networked device. In some implementations, the subscription request is received from the networked device. In response to determining that the networked device is authorized to access the resource, the cloud-based file system records a subscription based on the subscription request. A subscription identifies a set of one or more resources, a set of one or more modifications, and a set of one or more networked devices, such that if a modification of the set of modifications is made to a resource in the set of resources, the subscription will generate a notification to each networked device in the set of networked devices. In response to such a modification being made by a user, an application, or other suitable entity, the cloud-based file system transmits a notification regarding the modification to the networked device based on the recorded subscription. The notification may identify the subscription with which the notification is associated, provide information identifying the modification, or provide other suitable information.

BRIEF DESCRIPTION OF THE DRAWINGS

The systems and methods described herein are set forth in the appended claims. However, for the purpose of explanation, several embodiments are set forth in the following drawings.

DETAILED DESCRIPTION

In the following description, numerous details are set forth for the purpose of explanation. However, one of ordinary skill in the art will realize that the implementations described herein may be practiced without the use of these specific details and that the implementations described herein may be modified, supplemented, or otherwise altered without departing from the scope of the systems and methods described herein.

The systems and methods described herein relate to transmitting push notifications to a networked device in response to modifications made to a resource on a cloud storage system. If a networked device is authorized to access a resource on the cloud storage system, the cloud storage system may allow the networked device to subscribe to notifications regarding modifications made to the resource. In such a subscription, if a user, an application, or other suitable entity modifies the resource, the cloud storage system may push a notification to the networked device.

Figure 1:
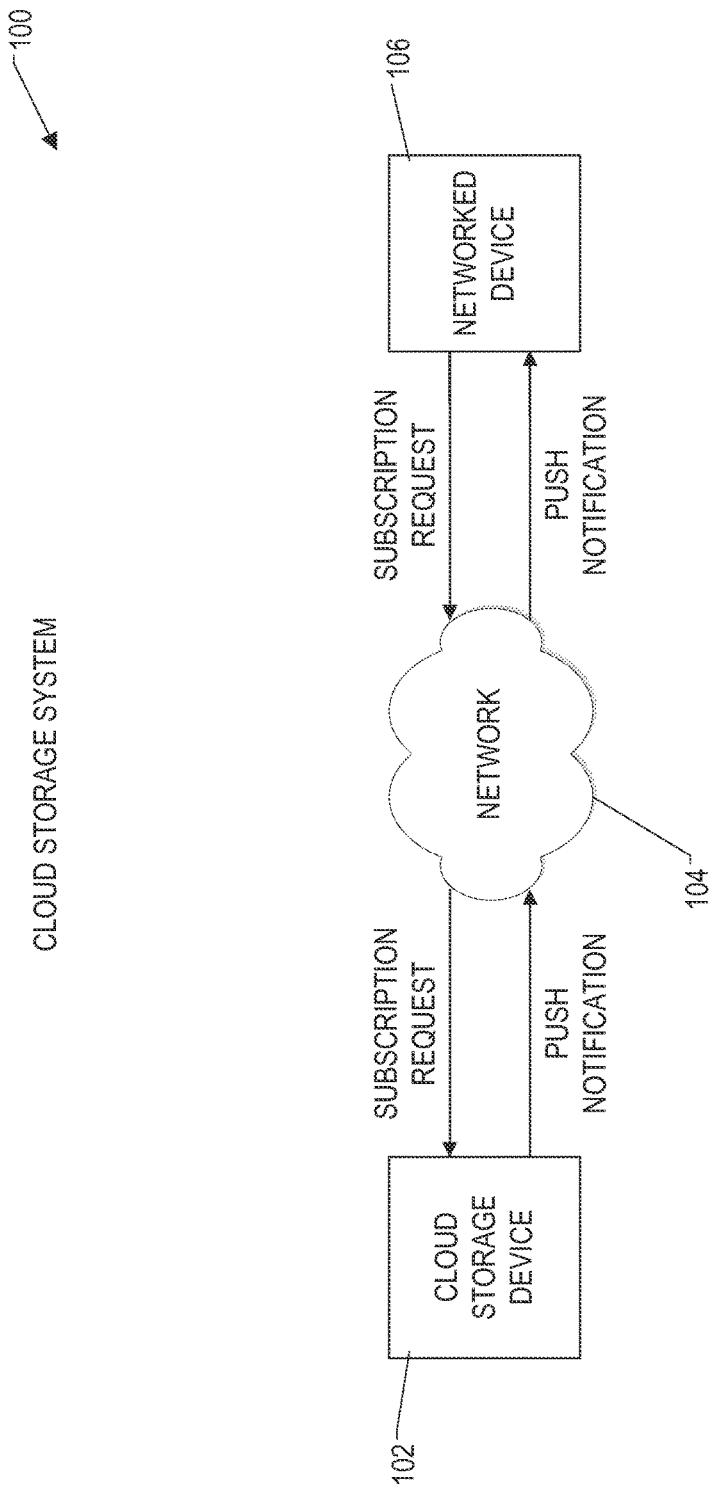
FIG. 1 is a block diagram of a cloud storage system, according to an illustrative implementation.

FIG. 1 is an illustrative block diagram of a cloud storage system 100, which provides remote storage of and access to resources. Resources may include folders, text files, image files, audio files, video files, presentation files, spreadsheets, binary data files, computer instructions, HyperText Markup Language (HTML) files, or other suitable computer resources. Resources are stored on cloud storage device 102, which may include a server, a personal computer, a mainframe, a cluster of computing devices, or some other suitable computing device, and which is described in more detail in relation to FIG. 2. Resources may be uploaded to or accessed from cloud storage device 102 via network 104. Network 104 is a computer network, and in certain implementations may be the Internet. As depicted, a networked device 106 may interact with cloud storage device 102 through network 104. In certain implementations, there may be a different number of cloud storage devices 102 or networked devices 106 than are here depicted.

A networked device 106 is a computing device that may be used to access cloud storage device 102, and may be a personal laptop computer, a personal desktop computer, a tablet computer, a smartphone, a server, a mainframe, a cluster of computing devices, or some other suitable computing device. A user may interact with networked device 106 using a direct input, such as a keyboard, a mouse, a touchscreen, or other suitable input, or through a remote computing device. Networked device 106 may allow a user to access or alter resources stored on cloud storage device 102, and may be administered by the user, the administrator of cloud storage device 102, or by a third party. Networked device 106 may be authorized to subscribe to push notifications regarding resources stored on cloud storage device 102. In some implementations, a networked device 106 may be integrated with cloud storage device 102. In certain implementations, networked device 106 may store information regarding one or more users, the data processing capacity of networked device 106, a list of resources on cloud storage device 102 that the user is authorized to access, or other suitable information regarding the capability of networked device 106 to access files stored on cloud storage device 102. In such implementations, networked device 106 may be configured to transmit a portion or the whole of such information upon first connecting to cloud storage device 102, in response to a query by cloud storage device 102, or under other suitable circumstances.

Cloud storage system 100 stores resources and allows a user to access the resources through a networked device 106. A networked device 106 connects to cloud storage device 102 through network 104. An application installed on or accessed through networked device 106 may generate, access, edit, or delete a resource stored on cloud storage device 102. If networked device 106 is authorized to access a resource, cloud storage device 102 may allow networked device 106 to subscribe to the resource, in which case cloud storage device 102 will push notifications regarding changes made to the resource to networked device 106.

Figure 2:
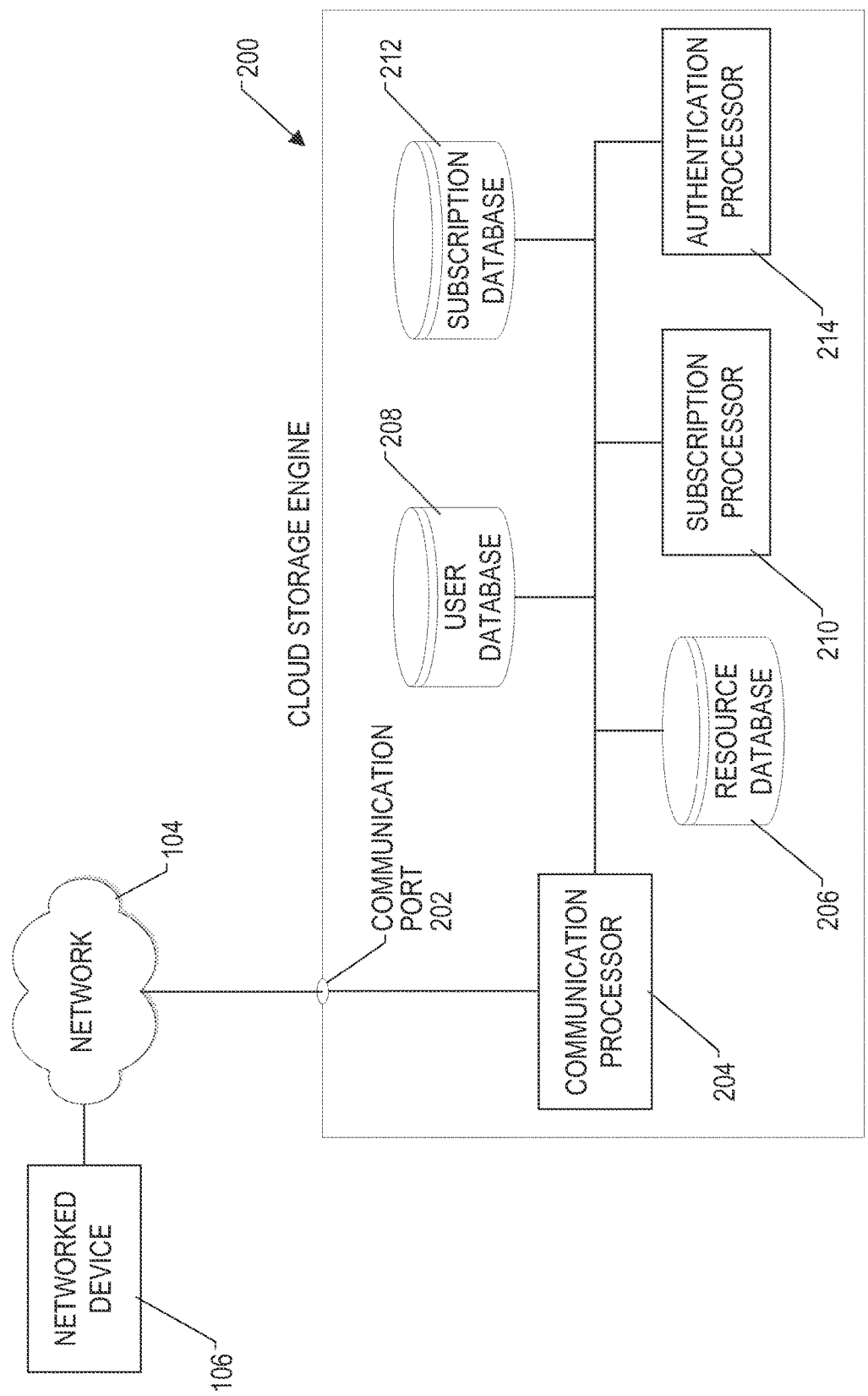
FIG. 2 is a block diagram of a cloud storage engine, according to an illustrative implementation.

FIG. 2 is an illustrative block diagram of a cloud storage engine 200, which may act as the cloud storage device 102 of FIG. 1. Cloud storage engine 200 allows networked device 106 to access files over network 104. Cloud storage engine 200 transmits and receives data through communication port 202. Communication processor 204 identifies user instructions received through communication port 202 and stores or transmits information based on the received instructions. The content and metadata of files may be stored in resource database 206 and user information may be stored in user database 208. Subscription processor 210 may record information regarding authorized subscriptions in subscription database 212, and may generate subscription messages based on criteria recorded in subscription database 212 and events in resource database 206 or user database 208. Authentication processor 214 may verify that a request to access or edit information associated with cloud storage engine 200 is authorized.

The depicted communication port 202 is a network port which receives user commands via network 104 and transmits information sent by cloud storage engine 200. Communication port 202 may include a 100BASE-TX port, a 1000BASE-T port, a 10GBASE-T port, a Wi-Fi antenna, a cellular antenna, or other suitable network ports. In certain implementations, there may be a different number of ports than are depicted. In certain implementations, communication port 202 may provide secure communications, such as by using the Secure Sockets Layer (SSL) protocol, the Transport Layer Security (TLS) protocol, or other suitable protocol.

Communication processor 204 may be a computer processor that identifies instructions received through communication port 202 and may store or transmit information based on those instructions. Upon a networked device 106 connecting to cloud storage engine 200, communication processor 204 may identify a user associated with the connection, in certain implementations by comparing login information provided by the user to information stored in user database 208. Communication processor 204 may further identify a user associated with an incoming communication from packet headers identifying the source of the communication, by querying the source of the communication, or through some other suitable method of identifying the user. Communication processor 204 may respond to a user command by generating, providing access to, altering, or deleting a resource, by transmitting data regarding a change to a resource, or by some other suitable measure according to the command. Communication processor 204 may forward commands associated with subscriptions to subscription processor 210, and may transmit or route subscription messages to a subscribing networked device 106.

Resource database 206 may be a computer-readable and -writable medium storing at least one resource associated with a cloud storage system 100. In some implementations, a portion of resource database 206 may be accessed through a remote network. Such a portion may be a third-party database. Resources stored on resource database 206 may include folders, text files, image files, audio files, video files, presentation files, spreadsheets, binary data files, computer instructions, HyperText Markup Language (HTML) files, or other suitable computer resources. Resource database 206 may also store metadata associated with each resource, which may include a Multipurpose Internet Mail Extensions (MIME) type of the resource, the time at which the resource was generated, one or more users associated with the resource, client servers 108 permitted to access the resource, subscriptions associated with the resource, or other suitable metadata. In some implementations, resource database 206 may further record the set of changes that have been made to a resource.

User database 208 may be a computer-readable and -writable medium storing information associated with at least one user of cloud storage engine 200. The information may include one or more of a username and password associated with a user, a list of the resources associated with each user, a list of at least one networked device 106 associated with the user, a list of at least one networked device 106 that the user has authorized to access a resource associated with the user, user-specified preferences, or other suitable user information.

Subscription processor 210 may be a computer processor that records valid subscription requests received through communication port 202 and generates messages according to subscriptions. If authentication processor 214 validates a subscription request, subscription processor 210 records the requested subscription in subscription database 212. Subscription processor 210 monitors resource database 206 and user database 208 to identify events meeting criteria of one or more subscriptions recorded in subscription database 212. Upon identifying such an event, subscription processor 210 generates a push notification in accordance with the subscription, which may be routed by communication processor 204 to one or more networked devices 106 designated by the subscription. In some implementations, subscription processor 210 may directly transmit a notification through communication port 202 to one or more networked devices 106. Subscription processor 210 may further delete a subscription from subscription database 212 in response to predetermined conditions, which may include the elapse of a predetermined period of time, the failure of a networked device 106 to acknowledge receipt of a message associated with a subscription, or other suitable conditions.

Subscription database 212 may be a computer-readable and -writable medium storing information regarding subscriptions associated with cloud storage engine 200. Subscription information may include a list of networked devices 106 that have subscribed to updates regarding a resource, a list of the characteristics of events prompting notifications to be sent to subscribers, the information to be included in a subscription notification, whether a networked device 106 is allowed to subscribe to updates regarding a resource or class of resources, the lifetime of each subscription, or other suitable information. As an illustrative example, if a networked device 106 runs a cloud printing service that prints documents placed in a designated folder, a subscription stored in subscription database 212 may indicate that a notification is to be transmitted to the networked device 106 whenever a file is placed within the designated folder. Similarly, if a subscription identifies that a networked device 106 should receive an update whenever an image file is associated with a user account, a notification may be sent to the networked device 106 whenever a pointer to an image file resource is newly associated with the user account in user database 208. In some implementations, subscription database 212 may further store rules for subscriptions, which may limit the criteria for subscription notifications, the lifetime of a subscription based on the criteria for subscription notifications, the number of subscriptions a networked device 106 may have, or other suitable rules.

Authentication processor 214 may be a computer processor that blocks unauthorized access to, editing of, or subscription to resources associated with cloud storage engine 200. Unauthorized access may be detected by comparing one or more of a username and password combination, information identifying a networked device 106, geographic information associated with the networked device 106, or other suitable information with corresponding information stored in resource database 206, user database 208, and subscription database 212. If authentication processor 214 cannot verify a request to subscribe to a resource or class of resources, authentication processor 214 may transmit a message to the user or a system administrator, block networked device 106, temporarily lock the user account, or take some other predetermined action. In certain implementations, authentication processor 214 may also verify that outbound notifications are being transmitted to an authorized networked device 106. In such implementations, authentication processor 214 blocks transmission of notifications not routed to an authorized networked device 106. In certain implementations, if a networked device 106 has not previously accessed resources associated with a user, authentication processor 214 may require identification information, which may include a username and password combination, an identification number provided to the user by a voice or text message sent to a telephone number previously provided by the user, or other predetermined identification information. In some implementations, authentication processor 214 may verify a security token provided by the networked device 106 against information stored in one or more of file database 206, user database 208, or subscription database 212. If networked device 106 is not authorized to access information, authentication processor 214 may prevent the application from accessing the information, transmit a message to the user or a system administrator, or take some other suitable action. In certain implementations, such a message to the user may ask if the user wishes to authorize the networked device 106 to access the information. In certain implementations, authentication processor 214 may establish a secure connection with networked device 106 using a protocol such as the SSL or TLS protocols.

Cloud storage engine 200 receives transmissions from networked devices 106 at communication port 202 via network 104. Communication processor 204 may forward a subscription request from a networked device 106 to authentication processor 214. Authentication processor 214 may compare information provided by the networked device 106 to information stored in one or more of resource database 206, user database 208, and subscription database 212 to determine if the networked device 106 is authorized to access information associated with the resource indicated in the subscription request. If the networked device 106 is successfully verified, authentication processor 214 may permit subscription processor 210 to record the requested subscription in subscription database 212. Based on the subscription, if a resource is generated, modified, deleted, or otherwise accessed, subscription processor 210 may generate notifications that communication processor 204 may push to one or more networked devices 106 according to the rules recorded in subscription database 212.

Figure 3:
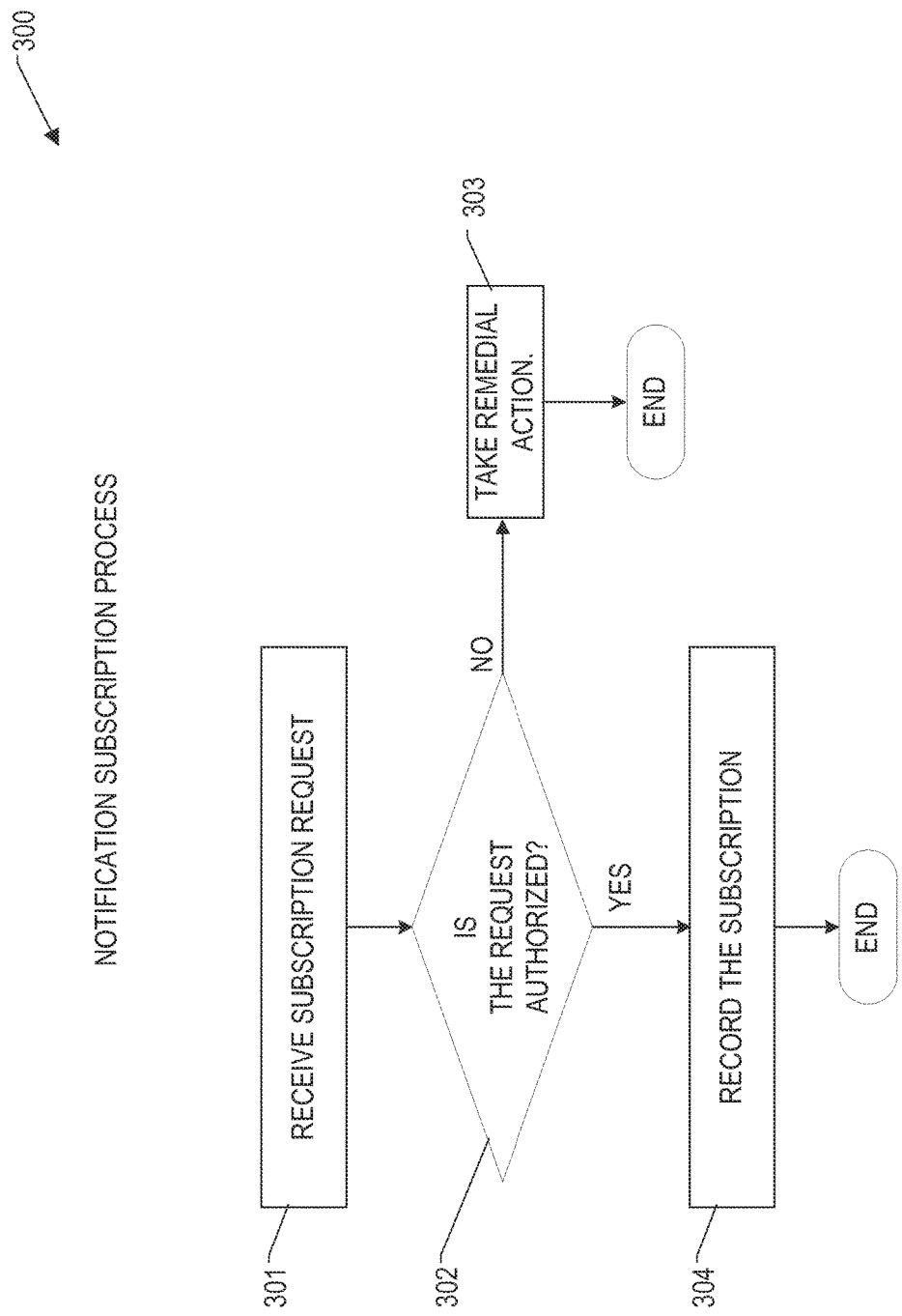
FIG. 3 is a flow chart of a process for subscribing to push notifications regarding modifications made to cloud computing resources, according to an illustrative implementation.

FIG. 3 is an illustrative flow chart of a notification subscription process 300. Referring to FIG. 1, notification subscription process 300 records a subscription of a networked device 106 to one or more resources on cloud storage device 102, such that the cloud storage device 102 notifies the networked device 106 of actions involving the resources according to the subscription. Referring to FIG. 2, notification subscription process 300 begins with step 301, in which communication processor 204 receives a subscription request. The subscription request may identify specific resources, a class of resources, or some combination thereof. As illustrative examples, a subscription request may designate a user preference file, image files associated with a particular user, or spreadsheets stored in a designated folder. The subscription request further identifies the actions that should prompt a notification, such as the generation of a resource, the modification of a resource, a command to access the resource, the deletion of a resource, or some other suitable action. The subscription request also indicates a destination address for push notifications that may be generated in accordance with the requested subscription, which may be a HyperText Transfer Protocol (HTTP) address or may provide some other suitable delivery channel for notifications. In some implementations, a subscription request may be included in a request to generate, access, or modify a resource.

In step 302, the authentication processor 214 determines whether the subscription request is authorized. A subscription request may be authorized if it is generated by an authorized user or if it is associated with a networked device 106 that has been authorized by such an authorized user. An authorized user may be the user who generated the resource, a user with permission to modify or delete the resource, or some other user suitably associated with the resource. A computing device may be authorized by a user if the user previously authorized the computing device to access the resource. Authentication processor 214 may carry out step 302 by determining whether the subscription request provides a security token or other information verifying that the request was approved by an authorized user, whether the source of the request is an authorized computing device, whether the destination address associated with the request is associated with an authorized computing device, or based on some other suitable criteria. If authentication processor 214 cannot determine that the request meets predetermined authorization criteria, process 300 ends with communication processor 204 taking remedial action in step 303. The remedial action may include rejecting the request, blocking the source of the request from accessing cloud storage engine 200, alerting a system administrator or a user associated with the resources indicated in the request, or some other appropriate action. If authentication processor 214 instead verifies that the request is authorized, notification subscription process 300 concludes with step 304.

In step 304, subscription processor 210 records the requested subscription in subscription database 212. Communication processor 204 may then consult the rules stored in subscription database 212 to send notifications in accordance with the requested subscription, as described in relation to FIG. 4. In some implementations, subscription processor 210 may also determine a lifetime of the requested subscription, such that notifications are no longer sent based on the subscription after its lifetime has expired. In such implementations, a subscription lifetime may be based on the type of resource associated with the subscription, the type of change associated with the subscription, or on some other suitable criteria. In some implementations, step 304 may be followed by the transmission of a subscription notification to the address indicated in the subscription request, which may include a subscription ID uniquely identifying the subscription, an expected lifetime of the subscription, an identification of the resource or resources associated with the subscription, an indication of the current status of the resource, or other suitable information. Subscriptions may also or alternatively be cancelled by the requesting networked device 106, in response to a user withdrawing authorization to access the associated resource from networked device 106, or based on some other suitable criteria. In some implementations, a notification may be sent to the subscribed address in the event of a subscription cancellation. In some such implementations, a cancellation notification may only be sent if the cancellation is in response to a predetermined criteria, such as a withdrawal of authorization for the subscribed server to access the resource associated with the subscription.

Figure 4:
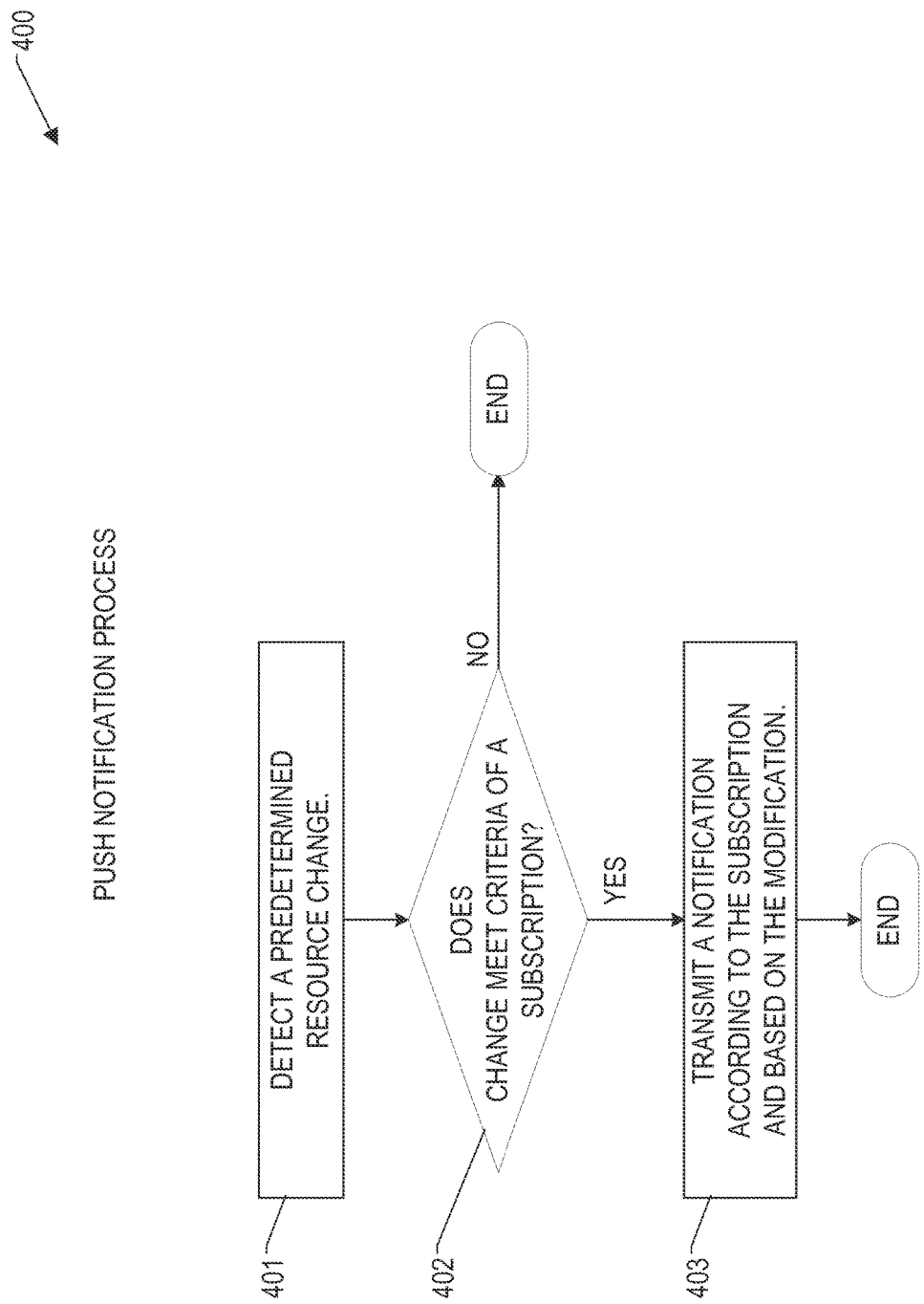
FIG. 4 is a flow chart of a process for transmitting push notifications to a server, according to an illustrative implementation.

FIG. 4 is an illustrative flow chart of a push notification process 400. Push notification process 400 generates push notifications based on subscriptions, such as the subscriptions recorded in notification subscription process 300. Referring to FIG. 2, push notification process 400 may be internal to cloud storage engine 200, and may thereby reduce latency in providing subscribing networked device 106 with information regarding resource modifications without requiring networked device 106 to frequently request information regarding a resource. Referring to FIG. 2, push notification process 400 begins with step 401, in which subscription processor 210 detects a predetermined change in resource database 206 or user database 208. The predetermined change may be the creation of a resource, the modification of a resource, the deletion of a resource, a change to the files associated with a user by user database 208, or some other suitable change, and may be detected when communication processor 204 modifies resource database 206 or user database 208 in response to a command. In some implementations, the predetermined change may include a change in metadata associated with a resource, which may include a change in when the resource was last accessed, by whom the resource was last accessed, the set of users authorized to modify the resource, or some other suitable criteria.

In step 402, subscription processor 210 determines whether the change detected in step 401 meets the criteria of a subscription recorded in subscription database 212. As described in relation to FIGS. 2 and 3, if the change of step 401 does not meet every criteria of at least one subscription recorded in subscription database 212, push notification process 400 ends without a notification being transmitted. If, on the other hand, the change does meet the criteria of a subscription, push notification process 400 ends with step 403. In step 403, subscription processor 210 generates a notification to a networked device 106 according to the subscription rules: a message regarding the change of step 401 is generated based on the subscription, and is addressed to the networked device 106 indicated by the subscription. Subscription processor 210 may transmit the notification to communication processor 204 for routing to the networked device 106, or in some implementations may transmit the notification directly to the networked device 106. In some implementations, subscription processor 210 may transmit the notification to authentication processor 214 so that authentication processor 214 may verify that the notification is addressed to an authorized networked device 106 before the notification is transmitted. The notification may identify the subscription that triggered the notification, the resource associated with the notification, the nature and magnitude of the event triggering the notification, or other suitable information. Latency between a notification-prompting event and the transmission of a notification may be between 40 and 150 ms based on the transmission channel.

The notification may be transmitted using HTTP, Extensible Messaging and Presence Protocol (XMPP), or some other suitable push delivery channel. In some implementations, different subscriptions may use different delivery channels. In some implementations, networked device 106 may respond to a notification with a notification acknowledgment. In such implementations, if no such acknowledgment is received within a predetermined period after transmission of the notification, push notification process 400 may attempt to retransmit the notification under predetermined conditions, which may include the passage of a predetermined period of time, an indication that the transmission channel to the subscribing server has reopened, or some other suitable conditions.

Figure 5:
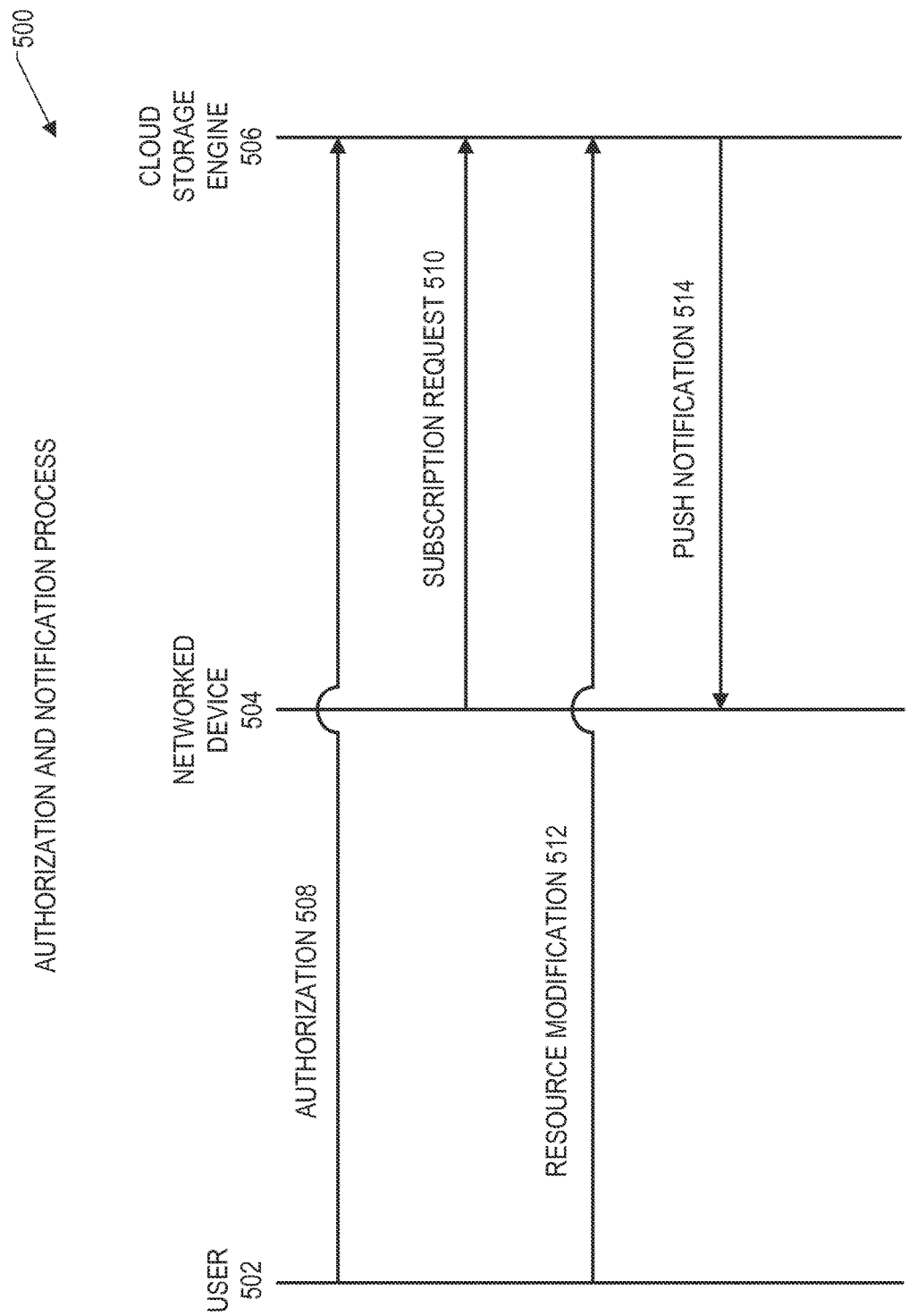
FIG. 5 is an exemplary process diagram depicting a networked device subscribing to push notifications from a cloud storage system, according to an illustrative implementation.

FIG. 5 is an exemplary process diagram depicting an authorization and notification process 500, in which a server is authorized to subscribe to notifications regarding a resource on a cloud storage engine and receives such a notification. As depicted, a user 502, a networked device 504, such as networked device 106 of FIG. 1, and a cloud storage engine 506, such as cloud storage engine 200 of FIG. 2, are all in communication with each other. In accordance with notification subscription process 300, user 502 transmits an authorization 508 to cloud storage engine 506. Authorization 508 permits networked device 504 to subscribe to one or more resources on cloud storage engine 506, and may include encrypted user identification information, information identifying a resource that networked device 504 may subscribe to, or other suitable information authorizing networked device 504 to subscribe to notifications regarding a resource stored on cloud storage engine 506. Networked device 504 subsequently transmits subscription request 510 to cloud storage engine 506, as described in relation to FIG. 3. In some implementations, authorization 508 may instead be transmitted to networked device 504, which may in turn include the authorization information in subscription request 510. Cloud storage engine 506 verifies that subscription request 510 was authorized by authorization 508 and records the verified subscription. As depicted, user 502 then transmits a resource modification 512 meeting the criteria of the recorded subscription to cloud storage engine 506. Although user 502 is depicted as transmitted the resource modification 512, resource modification 512 may alternatively be sent by a second user, by an application, or by some other suitable entity. As described in relation to FIG. 4, resource modification 512 may generate, delete, or otherwise modify a resource associated with the requested subscription, and may be generated using a networked device 106. Implementing resource modification 512 prompts cloud storage engine 506 to transmit push notification 514 to networked device 504. In some implementations, push notification 514 may be smaller than a predetermined limit to preserve bandwidth. In such implementations, networked device 504 may use the information provided in push notification 514 to determine whether to request further information regarding the indicated change.

In some implementations, networked device 504 may prompt user 502 to transmit authorization 508 to cloud storage engine 506. In some implementations, cloud storage engine 506 may respond to a subscription request 510 by requesting user 502 to transmit a suitable authorization 508.

In some implementations, networked device 504 may respond to a push notification 514 with an acknowledgment message. In some such implementations, cloud storage engine 506 may respond to a predetermined number of failures to receive an acknowledgment message within a predetermined amount of time by dropping the subscription associated with networked device 504.

Figure 6:
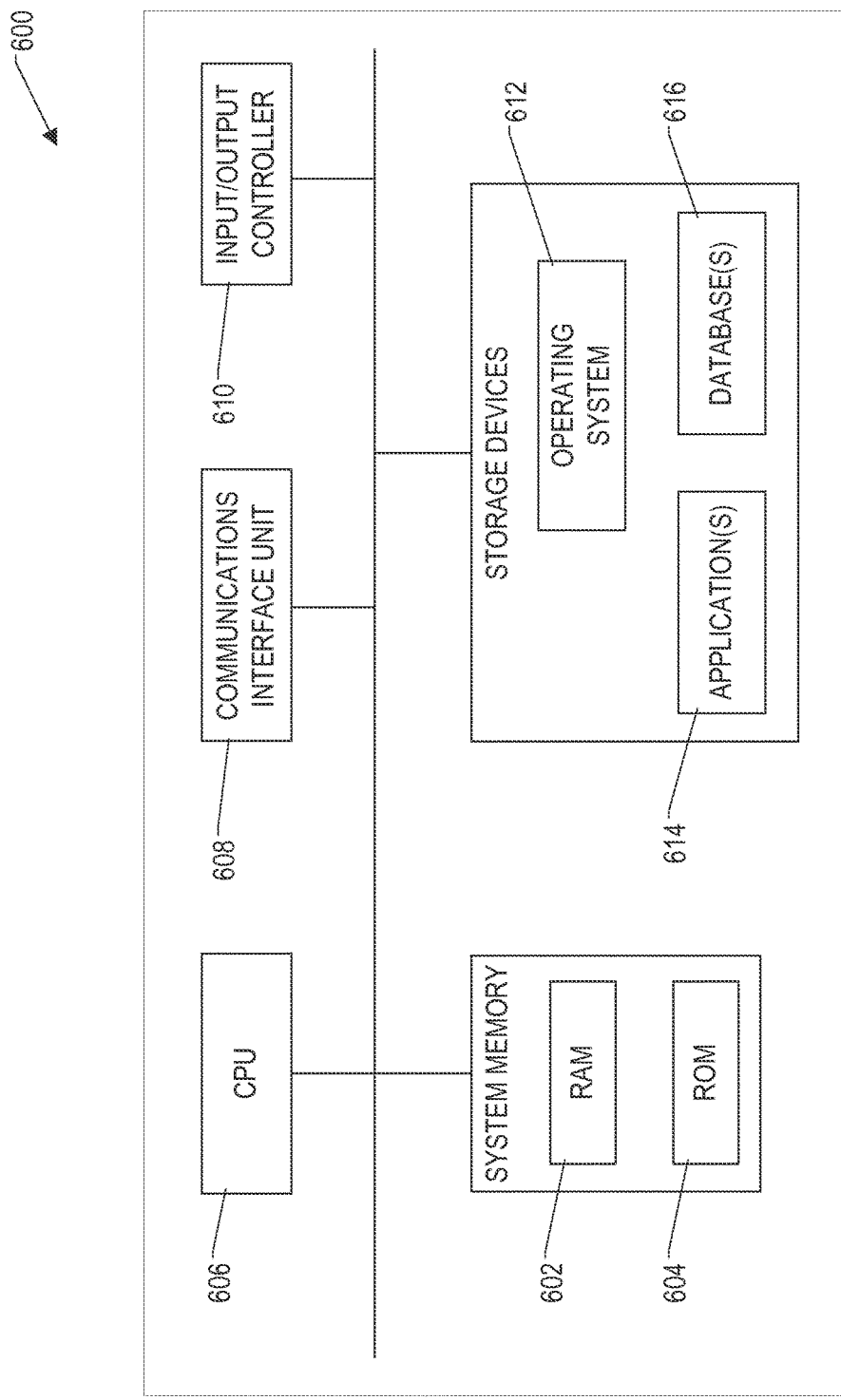
FIG. 6 is a block diagram of a computing device for performing any of the processes described herein, according to an illustrative implementation.

FIG. 6 is a block diagram of a computing device that can be used to implement or support any of the components of the system of FIG. 1 or 2, and for performing any of the processes described herein. Cloud storage engine 200 may be implemented on one or more computing devices 600 having suitable circuitry, and networked device 106 may communicate with cloud storage device 102 through one or more computing devices 600 having suitable circuitry. In certain aspects, a plurality of the components of cloud storage system 100 may be included within one computing device 600. In certain implementations, a component and a storage device may be implemented across several computing devices 600.

The computing device 600 comprises at least one communications interface unit, an input/output controller 610, system memory, and one or more data storage devices. This can support a network connection such as a connection to network 104 in FIG. 1. The system memory includes at least one random access memory (RAM 602) and at least one read-only memory (ROM 604). RAM 602 can support the file database 206 of FIG. 2, for example. All of these elements are in communication with a central processing unit (CPU 606) to facilitate the operation of the computing device 600. The computing device 600 may be configured in many different ways. For example, the computing device 600 may be a conventional standalone computer or alternatively, the functions of computing device 600 may be distributed across multiple computer systems and architectures. In FIG. 6, the computing device 600 may be linked, via network or local network, to other servers or systems.

The computing device 600 may be configured in a distributed architecture, wherein databases and processors are housed in separate units or locations. Some units perform primary processing functions and contain, at a minimum, a general controller or a processor and a system memory. In distributed architecture implementations, each of these units may be attached via the communications interface unit 608 to a communications hub or port (not shown) that serves as a primary communication link with other servers, client or user computers, and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM, and TCP/IP.

The CPU 606 comprises a processor, such as one or more conventional microprocessors and one or more supplementary co-processors such as math co-processors for offloading workload from the CPU 606. The CPU 606 is in communication with the communications interface unit 608 and the input/output controller 610, through which the CPU 606 communicates with other devices such as other servers, user terminals, or devices. The communications interface unit 608 and the input/output controller 610 may include multiple communication channels for simultaneous communication with, for example, other processors, servers, or client terminals.

The CPU 606 is also in communication with the data storage device. The data storage device may comprise an appropriate combination of magnetic, optical, or semiconductor memory, and may include, for example, RAM 602, ROM 604, a flash drive, an optical disc such as a compact disc, or a hard disk or drive. The CPU 606 and the data storage device each may be, for example, located entirely within a single computer or other computing device; or connected to each other by a communication medium, such as a USB port, serial port cable, a coaxial cable, an Ethernet cable, a telephone line, a radio frequency transceiver, or other similar wireless or wired medium or combination of the foregoing. For example, the CPU 606 may be connected to the data storage device via the communications interface unit 608. The CPU 606 may be configured to perform one or more particular processing functions.

The data storage device may store, for example, (i) an operating system 612 for the computing device 600; (ii) one or more applications 614 (e.g., computer program code or a computer program product) adapted to direct the CPU 606 in accordance with the systems and methods described here, and particularly in accordance with the processes described in detail with regard to the CPU 606; or (iii) database(s) 616 adapted to store information that may be utilized to store information required by the program. The depicted database 616 can be any suitable database system, and can be a local or distributed database system.

The operating system 612 and applications 614 may be stored, for example, in a compressed, an uncompiled and an encrypted format, and may include computer program code. The instructions of the program may be read into a main memory of the processor from a computer-readable medium other than the data storage device, such as from the ROM 604 or from the RAM 602, or from a computer data signal embodied in a carrier wave, such as that found within the well-known Web pages transferred among devices connected to the Internet. While execution of sequences of instructions in the program causes the CPU 606 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to a cloud storage system as described herein. The program also may include program elements such as an operating system 612, a database management system, and "device drivers" that allow the processor to interface with computer peripheral devices (e.g., a video display, a keyboard, a computer mouse, etc.) via the input/output controller 610.

The term "computer-readable medium" as used herein refers to any non-transitory medium that provides or participates in providing instructions to the processor of the computing device 600 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 606 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 600 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic, or optical signals, which are exemplary forms of wireless communications or data streams that carry various types of information.

Some implementations of the above described may be implemented by the preparation of application-specific integrated circuits or by interconnecting an appropriate network of conventional component circuits, as will be apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. For example, subscriptions may be addressed to networked devices, or to services administered by the administrators of the cloud storage service. It should be understood that various alternatives to the embodiments of the disclosure described herein may be employed in practicing the disclosure. Elements of an implementation of the systems and methods described herein may be independently implemented or combined with other implementations. It is intended that the following claims define the scope of the disclosure and that methods and structures within the scope of these claims and their equivalents be covered thereby.

What is claimed is:

1. A computer-implemented method of notifying a networked device of a modification to a data file of a cloud-based file system, comprising:
    receiving, from the networked device, a subscription request to obtain information pertaining to the modification of the data file by a user device of a user that has permission to modify the data file that is stored on the cloud-based file system, wherein the subscription request identifies the networked device and one or more modification actions to the data file by the user device that prompt a notification of the modification to the data file to be generated for the network device, wherein the one or more modification actions to the data file comprise at least one of generating the data file, accessing the data file, deleting the data file, or changing content of the data file;
    receiving, from the user device of the user, an authorization of the networked device to subscribe to receive the notification of the modification to the data file, wherein the authorization identifies the networked device, which is different from the user device;
    recording the authorization;
    determining whether the networked device identified in the subscription request is identified in the recorded authorization;
    responsive to determining that the networked device identified in the subscription request is identified in the recorded authorization, recording a subscription based on the subscription request, wherein the subscription identifies the networked device as having subscribed to receive the notification of the modification to the data file responsive to satisfaction of the one or more modification actions to the data file by the user device;
    identifying an action performed to the data file by the user device of the user;
    responsive to determining that the action performed by the user device of the user corresponds to at least one of the one or more modification actions to the data file identified in the subscription, transmitting to the networked device the notification of the modification to the data file; and
    responsive to a satisfaction of one or more predetermined criteria, deleting the recorded subscription, wherein the one or more predetermined criteria comprise a failure to receive a message from the networked device within a predetermined amount of time subsequent to the transmission of the notification to the networked device.

2. The method of claim 1, wherein the one or more predetermined criteria comprise reception of a subscription cancelation request from the networked device.

3. The method of claim 1, wherein the one or more predetermined criteria comprise passage of a predetermined amount of time.

4. The method of claim 1, wherein the notification identifies the subscription with which the notification is associated.

5. The method of claim 1, wherein the notification identifies the one or more modification action actions performed to the data file by the user device.

6. The method of claim 1, further comprising transmitting, in response to recording the subscription, a subscription acknowledgment to the networked device.

7. The method of claim 6, wherein the subscription acknowledgment comprises information regarding a status of the data file.

8. A cloud storage system, comprising:
a memory; and
a processor, coupled to the memory, to:
receive, from a networked device, a subscription request to obtain information pertaining to a modification of a data file by a user device of a user that has permission to modify the data file that is stored on the cloud storage system, wherein the subscription request identifies the networked device and one or more modification actions to the data file by the user device that prompt a notification of the modification to the data file to be generated for the network device, wherein the one or more modification actions to the data file comprise at least one of generating the data file, accessing the data file, deleting the data file, or changing content of the data file;
receive, from the user device of the user, an authorization of the networked device to subscribe to receive the notification of the modification to the data file, wherein the authorization identifies the networked device, which is different from the user device;
record the authorization;
determine whether the networked device identified in the subscription request is identified in the recorded authorization;
responsive to determining that the networked device identified in the subscription request is identified in the recorded authorization, record a subscription based on the subscription request, wherein the subscription identifies the networked device as having subscribed to receive the notification of the modifications to the data file responsive to satisfaction of the one or more modification actions to the data file by the user device;
identify an action performed to the data file by the user device of the user;
responsive to determining that the action performed by the user device of the user corresponds to at least one of the one or more modification actions to the data file identified in the subscription, transmit to the networked device the notification of the modification to the data file; and
responsive to a satisfaction of one or more predetermined criteria, delete the recorded subscription, wherein the one or more predetermined criteria comprise a failure to receive a message from the networked device within a predetermined amount of time subsequent to the transmission of the notification to the networked device.

9. The cloud storage system of claim 8, wherein the one or more predetermined criteria comprise reception of a subscription cancelation request from the networked device associated with the subscription.

10. The cloud storage system of claim 8, wherein the one or more predetermined criteria comprise passage of a predetermined amount of time.

11. The cloud storage system of claim 8, wherein the notification identifies the subscription.

12. The cloud storage system of claim 8, wherein the notification identifies the one or more modification action actions performed to the data file by the user device.

13. The cloud storage system of claim 8, wherein the processor is further to transmit, in response to recording the subscription, a subscription acknowledgment to the networked device.

14. The cloud storage system of claim 13, wherein the subscription acknowledgment comprises information regarding a status of the data file.

15. A non-transitory computer-readable medium comprising instructions, which when executed by a processor, cause the processor to perform operations comprising:
receiving, from a networked device, a subscription request to obtain information pertaining to a modification of a data file by a user device of a user that has permission to modify the data file that is stored at a cloud-based file system, wherein the subscription request identifies the networked device and one or more modification actions to the data file by the user device that prompt a notification of the modification to the data file to be generated for the network device, wherein the one or more modification actions to the data file comprise at least one of generating the data file, accessing the data file, deleting the data file, or changing content of the data file;
receiving, from the user device the user, an authorization of the networked device to subscribe to receive the notification of the modification to the data file, wherein the authorization identifies the networked device, which is different from the user device;
recording the authorization;
determining whether the networked device identified in the subscription request is identified in the recorded authorization;
responsive to determining that the networked device identified in the subscription request is identified in the recorded authorization, recording a subscription based on the subscription request, wherein the subscription identifies the networked device as having subscribed to receive the notification of the modification to the data file responsive to satisfaction of the one or more modification actions to the data file by the user device;
identifying an action performed to the data file by the user device of the user;
responsive to determining that the action performed by the user device of the user corresponds to at least one of the one or more modification actions to the data file identified in the subscription, transmitting to the networked device the notification of the modification to the data file; and
responsive to a satisfaction of one or more predetermined criteria, deleting the recorded subscription, wherein the one or more predetermined criteria comprise a failure to receive a message from the networked device within a predetermined amount of time subsequent to the transmission of the notification to the networked device.

* * * * *